US011198549B2

(12) United States Patent
Kuragano et al.

(10) Patent No.: US 11,198,549 B2
(45) Date of Patent: Dec. 14, 2021

(54) SHEET FOR CONTAINER

(71) Applicant: Kao Corporation, Tokyo (JP)

(72) Inventors: Akira Kuragano, Sumida-ku (JP); Yoshinori Inagawa, Sumida-ku (JP); Daisuke Kodama, Sumida-ku (JP); Ryo Shibutani, Sumida-ku (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 16/770,753

(22) PCT Filed: Apr. 4, 2019

(86) PCT No.: PCT/JP2019/014961
§ 371 (c)(1),
(2) Date: Jun. 8, 2020

(87) PCT Pub. No.: WO2020/202529
PCT Pub. Date: Oct. 8, 2020

(65) Prior Publication Data

US 2021/0039860 A1 Feb. 11, 2021

(51) Int. Cl.
*B65D 75/00* (2006.01)
*B65D 1/02* (2006.01)
(Continued)

(52) U.S. Cl.
CPC ......... *B65D 75/008* (2013.01); *B65D 1/0246* (2013.01); *B65D 65/40* (2013.01);
(Continued)

(58) Field of Classification Search
CPC .............. B65D 75/008; B65D 75/5883; B65D 75/5872; B65D 75/5861; B65D 77/06;
(Continued)

(56) References Cited

U.S. PATENT DOCUMENTS 2,095,067 A * 10/1937 Kirk ...................... B65D 31/04 383/107
2,643,021 A * 6/1953 Freedman ............ A47J 41/022 220/592.16

(Continued)

FOREIGN PATENT DOCUMENTS

CA 1 145-724 A 5/1983
JP 54072192 A * 6/1979

(Continued)

OTHER PUBLICATIONS

Translation of JP54072192, Ogasawara et al., Jun. 9, 1979, Figs. 3 and 4 (Year: 1979).*

(Continued)

*Primary Examiner* — Robert J Hicks
(74) *Attorney, Agent, or Firm* — Oblon, McClelland, Maier & Neustadt, L.L.P.

(57) ABSTRACT

Provided is a sheet for container to be used in a flexible container, the sheet for container having a plurality of films layered in the sheet for container, the sheet for container including: a first film including a first base-material layer, which is coated with a first applying-type gas barrier layer and made of a single type of material having a heat-sealing property; and a second film including a second base-material layer, which is coated with a second applying-type gas barrier layer and made of a single type of material that is a same type of material as the first base-material layer, in which: the first film and the second film are attached to each other by heat sealing; and a gas enclosing portion, which is partially non-attached and in which gas is able to be enclosed, is formed between the first film and the second film.

19 Claims, 11 Drawing Sheets

105
103
102
5
101

(51) Int. Cl.

| | |
|---|---|
| ***B65D 65/40*** | (2006.01) |
| ***B65D 75/58*** | (2006.01) |
| ***B65D 77/06*** | (2006.01) |

(52) U.S. Cl.
CPC ......... *B65D 75/5883* (2013.01); *B65D 77/06* (2013.01); *B65D 2501/0081* (2013.01)

(58) Field of Classification Search
CPC .... B65D 65/40; B65D 1/0215; B65D 1/0207; B65D 1/0246; B65D 31/10; B65D 31/04; B65D 31/02; B65D 25/14; A61J 1/10
USPC ....... 220/678, 62.22, 62.21, 62.12; 215/13.1, 215/12.2, 12.1; 383/113, 109, 110; 428/35.4, 35.2, 36.6, 36.7
See application file for complete search history.

(56) References Cited

U.S. PATENT DOCUMENTS

| | | | | | |
|---|---|---|---|---|---|
| 3,743,172 | A | | 7/1973 | Ackley et al. | |
| 4,197,890 | A | * | 4/1980 | Simko | F25D 31/007 383/97 |
| 4,247,584 | A | * | 1/1981 | Widiger | B32B 27/08 428/35.4 |
| 4,615,926 | A | * | 10/1986 | Hsu | B32B 27/08 428/35.2 |
| 4,868,025 | A | * | 9/1989 | Strzelewicz | B29C 65/18 428/35.2 |
| 5,310,587 | A | * | 5/1994 | Akahori | B32B 7/02 428/35.2 |
| 6,003,670 | A | * | 12/1999 | Beer | B32B 27/08 206/459.5 |
| 6,239,210 | B1 | * | 5/2001 | Kim | B29C 49/0005 524/538 |
| 7,976,917 | B2 | * | 7/2011 | Suzuki | B32B 27/32 428/35.2 |
| 2005/0031812 | A1 | * | 2/2005 | Suzuki | B29C 66/1122 428/35.2 |
| 2013/0292287 | A1 | | 11/2013 | Stanley et al. | |
| 2013/0292353 | A1 | | 11/2013 | Stanley et al. | |
| 2016/0185517 | A1 | * | 6/2016 | Matsumoto | B65D 85/73 426/66 |
| 2018/0312286 | A1 | | 11/2018 | Lester et al. | |
| 2019/0168941 | A1 | | 6/2019 | Otsuka et al. | |
| 2019/0248546 | A1 | | 8/2019 | Inagawa et al. | |

FOREIGN PATENT DOCUMENTS

| | | | | | |
|---|---|---|---|---|---|
| JP | 2012-35885 | A | | 2/2012 | |
| JP | 2015-520707 | A | | 7/2015 | |
| JP | 2015520707 | A | * | 7/2015 | B32B 1/02 |
| JP | 6093008 | B2 | | 3/2017 | |
| JP | WO2017/043598 | A1 | | 3/2017 | |
| JP | 2017-141063 | A | | 8/2017 | |
| JP | 6193535 | B1 | | 9/2017 | |
| JP | 2018-47919 | A | | 3/2018 | |
| JP | 2018047919 | A | * | 3/2018 | |
| JP | 2018-144885 | A | | 9/2018 | |
| JP | 2018-144886 | A | | 9/2018 | |
| JP | 2020-63064 | A | | 4/2020 | |
| WO | WO 2017/042905 | A1 | | 3/2017 | |

OTHER PUBLICATIONS

International Search Report dated Jul. 2, 2019 in PCT/JP2019/014961 filed on Apr. 4, 2019 (with English Translation of Categories of Cited Documents), 2 pages.

Extended European Search Report dated Dec. 16, 2020 in European Patent Application No. 19888258.1, 7 pages.

* cited by examiner

SHEET FOR CONTAINER

TECHNICAL FIELD

The present invention relates to a sheet for container, a flexible container, and a product packed in the flexible container (herein after simply referred to as a flexible-container-packed product).

BACKGROUND ART

As a container made of a sheet material (herein after simply referred to as a sheet-material container) having a structure in which a plurality of films are layered and a filling material such as air is enclosed between the layers thereof, Patent Document 1, for example, discloses a sheet-material container including an inner container that accommodates a content to be accommodated, and a cover formed by a cover-forming sheet material obtained by the layer stack of a plurality of film layers and covering the inner container. The cover-forming sheet material includes a film region (attached region) at which the plurality of film layers are attached to each other, and a filling-material enclosing portion. In the filling-material enclosing portion, a filling material such as air is provided between the plurality of film layers, and the filling-material enclosing portion bulges out to the thickness direction of the cover-forming sheet material than the film region. The sheet-material container further includes an outside-air introducing portion that introduces outside air to a place between the inner container and the cover.

CITATION LIST

Patent Document 1
Japanese Patent No. 6193535

SUMMARY OF THE INVENTION

The Present Invention Relates to:

a sheet for container to be used in a flexible container, the sheet for container having a plurality of films layered in the sheet for container, the sheet for container including: a first film including a first base-material layer, which is coated with a first applying-type gas barrier layer and made of a single type of material having a heat-sealing property; and a second film including a second base-material layer, which is coated with a second applying-type gas barrier layer and made of a single type of material that is a same type of material as the first base-material layer, in which: the first film and the second film are attached to each other by heat sealing; and a gas enclosing portion, which is partially non-attached and in which gas is able to be enclosed, is formed between the first film and the second film; and a sheet for container to be used in a flexible container, the sheet for container having a plurality of films layered in the sheet for container, the sheet for container including: a first film including a first base-material layer made of a single type of material having a heat-sealing property and a gas barrier property; and a second film including a second base-material layer made of a single type of material that is a same type of material as the first base-material layer, in which: the first film and the second film are attached to each other by heat sealing; a gas enclosing portion, which is partially non-attached and in which gas is able to be enclosed, is formed between the first film and the second film; and a function layer that protects the first base-material layer or the second base-material layer is formed on at least one of an outer surface of the first film and an outer surface of the second film.

BRIEF DESCRIPTION OF THE DRAWINGS

FIG. 5 are cross-sectional views illustrating a modified example of the sheet for container according to the first embodiment of the present invention.

DESCRIPTION OF EMBODIMENTS

Figure 1:
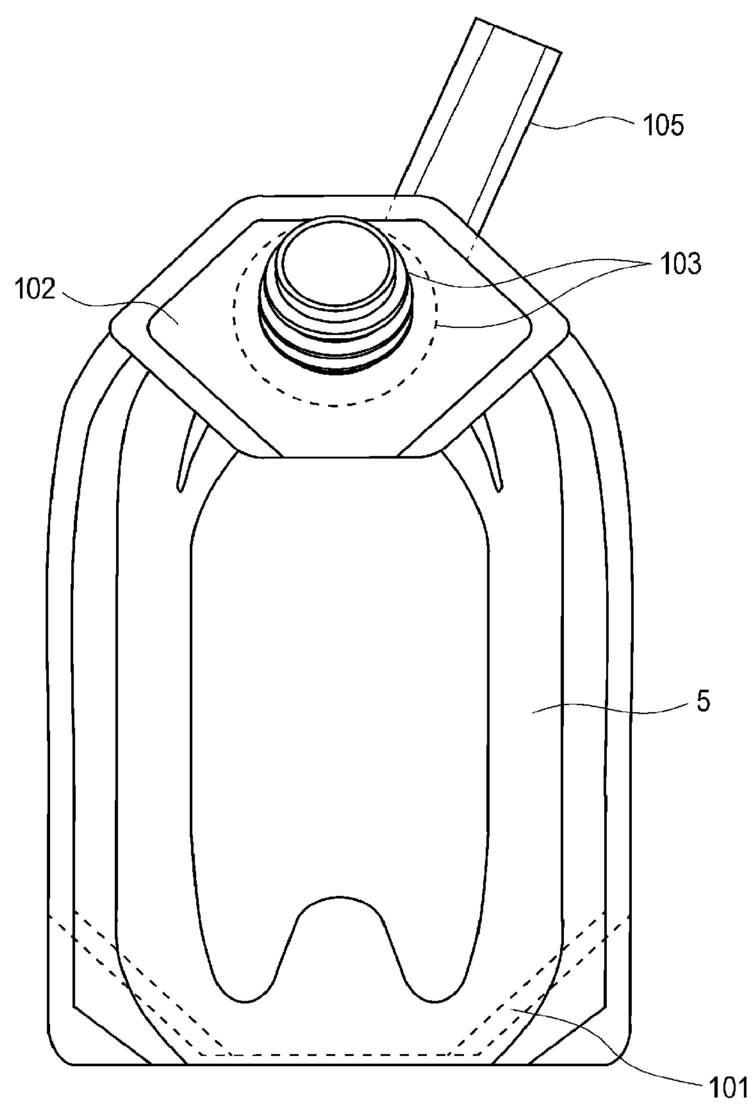
FIG. 1 is a front view of a sheet for container according to a first embodiment of the present invention.

The structure of the sheet-material container (flexible container) disclosed in Patent Document 1 is maintained by enclosing the filling material in the filling-material enclosing portion. Therefore, the sheet material can be made to be thinner. After the content to be accommodated is used up, the filling material can be removed from the filling-material enclosing portion. As a result, the container can lose its rigidity, and can be crushed to a small size. Therefore, waste can be reduced.

However, in order to reduce the environmental load more, further improvement is required for various sheet-material containers in terms of environmental properties and the like. According to the examination of the inventor of the present invention, the sheet-material container disclosed in Patent Document 1 is excellent in terms of reducing waste, but there is room for further improvement from the viewpoint of recycling, in particular.

In the sheet-material container disclosed in Patent Document 1, the filling material is enclosed in the filling-material enclosing portion and the filling-material enclosing portion bulges out. As a result, rigidity is provided to the main body of the container, and the structure thereof is maintained. However, there is room for further improvement also in terms of suppressing gas leakage due to the occurrence of peeling (delamination) and the generation of a crack at a place near the filling-material enclosing portion when the filling material is gas such as air.

According to the present invention, a sheet for container, a flexible container, and flexible-container-packed product in which the generation of a crack and the peeling of the films at a place near the gas enclosing portion hardly occurs and which also have high recyclability can be provided.

Preferable embodiments of the present invention are described below with reference to the drawings. Note that similar components are denoted by the same reference characters throughout the drawings, and overlapping descriptions will not be repeated.

[Entire Configuration]

First, the entire configuration of the sheet for container, the flexible container, and the flexible-container-packed product according to the present invention is described with reference to FIG. 1 to FIG. 4 and FIG. 11.

The sheet for container according to the present invention is a sheet for container, which is used in a flexible container and in which a plurality of films are layered, and includes two embodiments below.

Figure 3:
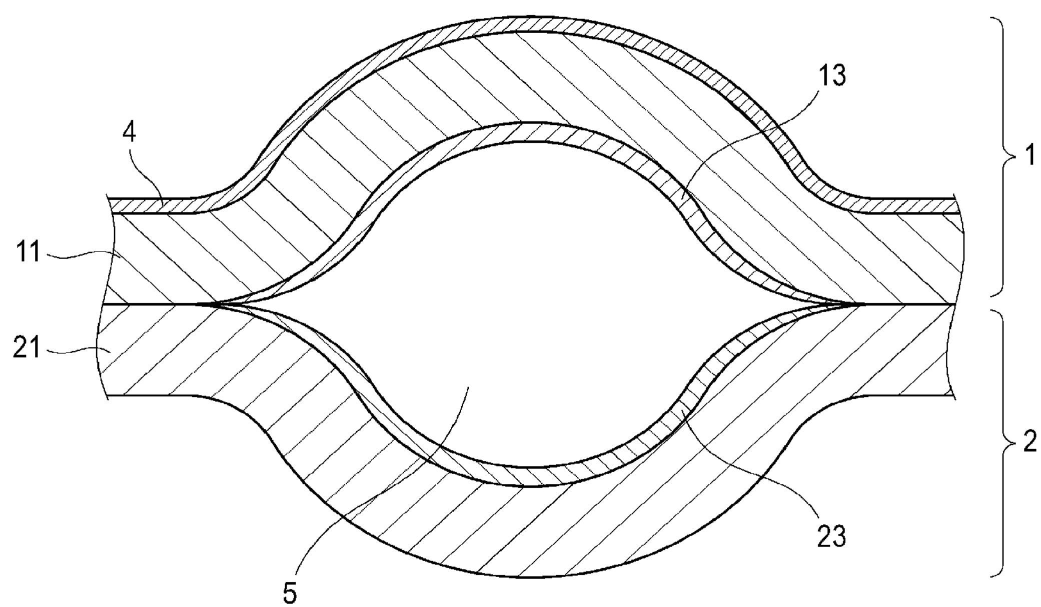
FIG. 3 is a cross-sectional view of a film layer taken along line III-III in FIG. 2.
Figure 4:
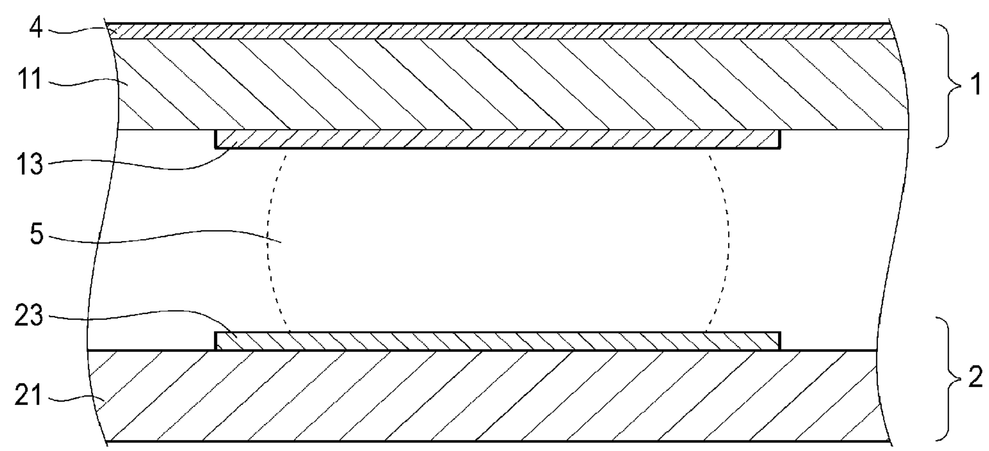
FIG. 4 illustrates the cross-sectional view illustrated in FIG. 3 in a state in which the films are separated from each other.

A first embodiment of the sheet for container according to the present invention includes a first film 1 including a first base-material layer 11, which is coated with a first applying-type gas barrier layer 13 and made of a single type of material having a heat-sealing property, and a second film 2 including a second base-material layer 21, which is coated with a second applying-type gas barrier layer 23 and made of a single type of material having a heat-sealing property that is the same type of material as the first base-material layer 11, as those illustrated in FIG. 3 and FIG. 4, for example. The first film 1 and the second film 2 are attached (film-attached) to each other by heat sealing.

Figure 11:
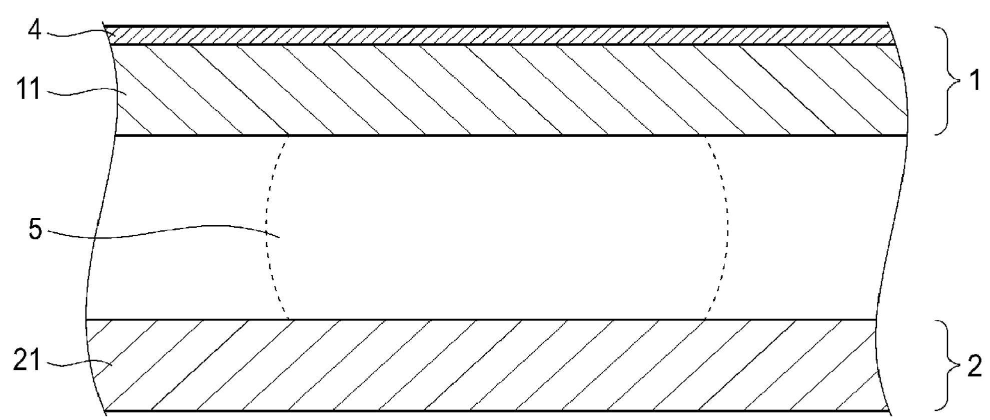
FIG. 11 is a cross-sectional view of a sheet for container according to a second embodiment of the present invention.

A second embodiment of the sheet for container according to the present invention includes the first film 1 including the first base-material layer 11 made of a single type of material having both of a heat-sealing property and a gas barrier property, and the second film 2 including the second base-material layer 21 made of a single type of material having both of a heat-sealing property and a gas barrier property that is the same type of material as the first base-material layer 11 as those illustrated in FIG. 11, for example. The first film 1 and the second film 2 are attached (film-attached) to each other by heat sealing. On at least one of the outer surface of the first film 1 and the outer surface of the second film 2, a function layer 4 that protects the first base-material layer 11 or the second base-material layer 21 is formed.

In both of the first embodiment and the second embodiment, a gas enclosing portion 5, which is partially non-attached and in which the gas can be enclosed, is formed between the first film 1 and the second film 2. A non-attached region may be further included between the first film 1 and the second film 2 besides the gas enclosing portion 5 and the film attached region at which the films are attached to each other.

In FIG. 4 and FIG. 11, in order to illustrate the configuration of the sheet for container according to the present invention in an easy-to-understand manner, the first film 1 and the second film 2 are illustrated in a state of being separated from each other as a matter of convenience. However, in a state in which the above are film-attached to each other, the film layers may be in contact with each other in a non-attached manner at the non-attached regions and the gas enclosing portion 5 before the gas is enclosed. The same applies to FIG. 5A and FIG. 6 to FIG. 10 described below.

The sheet for container according to the present invention can be produced as below. For example, a sheet material in which the gas enclosing portion 5 is formed by layering the first film 1 and the second film 2 described above with each other and partially attaching the films to each other by heat sealing. The sheet material is folded, and the peripheral portions of the portions forming the sheet for container are attached to each other by heat sealing and the like. As a result, a bag is formed. Then, unnecessary portions are removed by cutting and the like.

Figure 2:
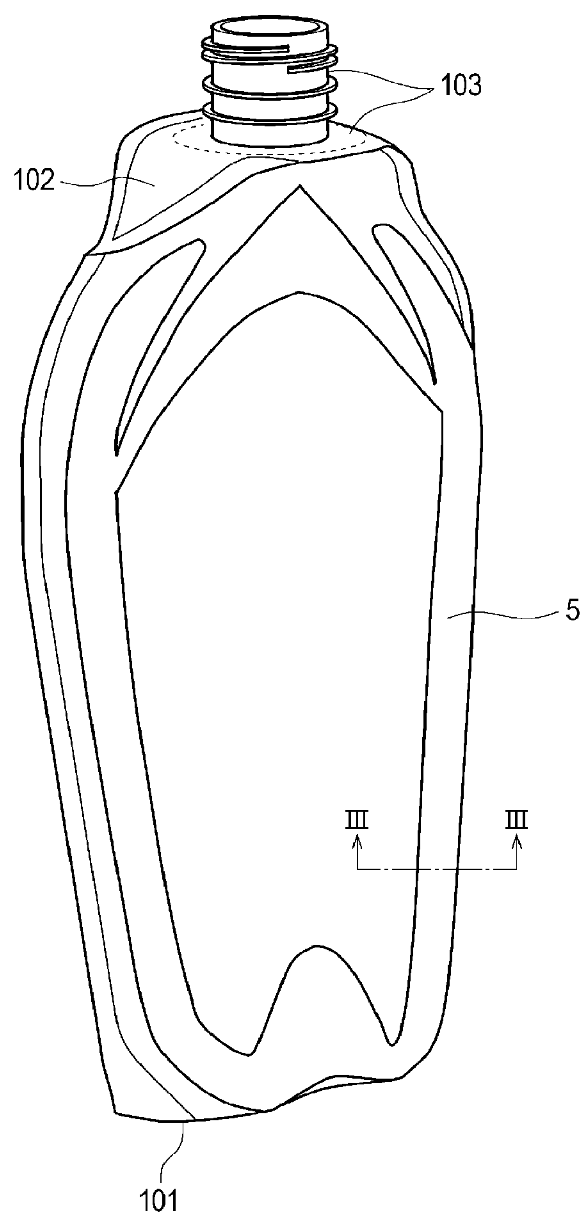
FIG. 2 is a front view of a flexible container formed with use of the sheet for container according to the first embodiment of the present invention.

As illustrated in FIG. 1 and FIG. 2, for example, the gas enclosing portion 5 is formed in a continuous manner along the periphery of the main body of the container when the flexible container is formed with use of the sheet for container according to the present invention. Before or after the content to be accommodated is accommodated, the gas enclosing portion 5 of the flexible container is filled with gas from a gas introducing portion 105 and the like in which a non-attached region, which is integrally provided with the film layers and communicates with the gas enclosing portion 5, reaches to the outer ridge thereof, for example. The gas enclosing portion 5 bulges out to the thickness direction of the sheet material. As a result, rigidity is provided to the main body of the container. In other words, high self-standing property, compressive strength, and squeeze-back property are given to the main body of the container. The gas introducing portion 105 is sealed in an appropriate manner after the gas is provided and is cut off as necessary.

The gas enclosing portion 5 does not necessarily need to be formed in a continuous manner, and a plurality of the gas enclosing portions 5 may be formed so as to be independent of each other. The gas enclosing portion 5 can be formed in places other than the periphery of the main body of the container, and the number and the regions of formation thereof are not particularly limited. After the content to be accommodated that is accommodated in the flexible container is used up, the gas is removed from the gas enclosing portion 5. Therefore, the main body of the container loses its rigidity, and hence the main body of the container can be easily crushed to a small size. As a result, the reduction of waste and the reduction of the environmental load can be expected.

As the type of the gas to be enclosed in the gas enclosing portion 5, air, nitrogen, oxygen, inert gas (such as argon and helium), and the like are exemplified. The type is not particularly limited, but air is preferably used from the viewpoint of cost and the like. The internal pressure of the gas enclosing portion 5 is not limited either, but is preferably not less than 10 kPa and not more than 500 kPa, for example, and is more preferably a pressure higher than the atmospheric pressure from the viewpoint of giving sufficient rigidity when the flexible container is formed.

As described above, the flexible container having a shape such as the shape disclosed in Japanese Patent No. 6193535, for example, in which the second film 2 is arranged on the inner side (the side on the inside of the container) of the first film 1, an accommodation region that accommodates the content to be accommodated is included on the inner side of the second film 2, and the gas is enclosed in the gas enclosing portion 5 can be formed with use of the sheet for container according to the present invention. In more detail, a flexible container in which the second film 2 is arranged so as to surround the accommodation region and the gas enclosing portion 5 is arranged between the first film 1 and the second film 2 and on the outer side of the accommodation region can be formed. As illustrated in FIG. 1 and FIG. 2, in the sheet for container according to the present invention, in order to cause the flexible container to have a form that is able to stand up on its own when the flexible container is formed, a bottom gusset portion 101 serving as the bottom portion of the container may be provided, and a top gusset portion 102 serving as the top surface portion of the container may be provided on an end portion on the side opposite from the bottom gusset portion 101. Alternatively, the sheet for container according to the present invention may have a form supposing a case of a laid-down arrangement and not a standing-up arrangement.

In the sheet for container according to the present invention, an opening portion from which the content to be accommodated is accommodated or discharged is provided. A spout 103 sealed by a cap with a pump or the like may be provided on the opening portion. From the viewpoint of increasing recyclability, the spout 103 is preferred to be made of the same type of material as the base-material layers or is preferred to be easily separated from the film layers. A screw thread for sealing the opening portion described above may also be provided. Alternatively, the sheet for container according to the present invention may have a configuration in which the opening portion thereof is a non-attached portion in the accommodation region of the film layers, the content to be accommodated is accommodated from the non-attached portion, and the non-attached portion is tight-sealed by heat sealing, which may be selected as appropriate depending on the form of the main body of the container and the like.

With use of the flexible container formed using the sheet for container according to the present invention, the flexible-container-packed product in which the content to be accommodated is accommodated in the accommodation region can be obtained. When the content to be accommodated that is accommodated in the flexible-container-packed product is used, the content to be accommodated is used by being discharged from the opening portion by squeezing, pumping, and the like. The type of the content to be accommodated that is accommodated in the flexible container is not particularly limited, but examples thereof include shampoo, hair conditioner, body soap, face wash, detergent, bleach, softener, beverage, food, engine oil, and the like.

The content to be accommodated may be liquid (including paste) or a solid (for example, grain-like objects (including granular objects) or powder-like objects).

When the content to be accommodated is liquid, the viscosity thereof is preferably not less than 1 mPa·s and not more than 120,000 mPa·s (measured by a B-type viscometer (for example, Viscometer TV-10 or Viscometer TVB-10 manufactured by Toki Sangyo Co., Ltd)), and is more preferably not less than 1 mPa·s and not more than 60,000 mPa·s at 30 degrees centigrade, for example.

First Embodiment

Next, the first embodiment relating to the configuration of the film layer of the sheet for container according to the present invention is described in detail.

The first embodiment of the sheet for container according to the present invention includes the first film 1 (outer-side main-body film) as the outermost film (the film arranged on the most outer-surface side in the sheet for container and covering the entire sheet for container) thereof. The first film 1 includes the first base-material layer 11 coated with the first applying-type gas barrier layer 13 and made of a single type of material having a heat-sealing property.

Now, in the first embodiment of the sheet for container according to the present invention, the first film 1 may include a coating layer the thickness of which is less than 50% of the thinnest monolayer of the base-material layer such as the applying-type gas barrier layer and a function layer described below in addition to the base-material layer. All of the films above more preferably have a configuration in which layers other than the applying-type gas barrier layer, the function layer, and the base-material layer are not included, and the applying-type gas barrier layer and the function layer more preferably each have a thickness that is less than 20% of the thinnest monolayer of the base-material layer. This also applies to the second film 2 and a third film 3 described below.

First, the first applying-type gas barrier layer 13 is a coating layer formed by applying a material having a gas barrier property to either of the surfaces of the first base-material layer 11, and a vapor depositing layer formed by vapor-depositing metal, silica, and the like is not included in the first applying-type gas barrier layer 13. In other words, the first applying-type gas barrier layer 13 is limited to a coating layer formed by applying a material having a gas barrier property. The material having a gas barrier property is not particularly limited as long as the material can form a coating layer by being applied, but suitable materials include polyvinylidene chloride, ethylene-vinyl alcohol copolymer (EVOH), an organic (ethylene-vinyl alcohol copolymer resin (EVOH) based)/inorganic (plate-like filler) nanocomposite material, an organic (vinyl acetate (VA) based)/inorganic (siloxane polymer) hybrid-type material, polyvinyl alcohol (PVOH), a copolymer of polyvinyl alcohol (PVOH), acrylic acid, and methyl methacrylate, and hydroxy polyurethane, for example. In particular, materials that have a high applying property (adhesive property when applying is performed) for the base-material layer, and/or able to be separated from the base-material layer by treatment by alkaline water, warm water, an organic solvent, and the like are more preferably used.

The first base-material layer 11 needs to be coated by the first applying-type gas barrier layer 13 by at least one layer. The gas barrier property thereof is preferably not more than 100 mL/m$^2$·day·atm (measured by a method in compliance with JIS K7126 by OX-TRAN2/21ML manufactured by MOCON Inc.), and is more preferably not more than 10 mL/m$^2$·day·atm at 23 degrees centigrade and 65% RH. In order to increase the gas barrier property more, the first applying-type gas barrier layer 13 may have a configuration in which coating of one or more materials selected from the abovementioned materials is performed on one surface of the first base-material layer 11 in an overlapping manner so as to form a plurality of layers, or a configuration in which coating of one or more layers is performed on both surfaces of the first base-material layer 11.

The first base-material layer 11 coated with the first applying-type gas barrier layer 13 described above is a layer serving as the main part of the film made of a single type of material having a heat-sealing property. The material satisfying such properties is not limited, but suitable examples include polyethylene (PE), polypropylene (PP), amorphous polyethylene terephthalate (amorphous PET), and the like, and those materials may be biomass materials.

The expression of "single type of material" in this embodiment means materials in which film material that is the ingredient is a single type of material, that is, materials in which the molecular frameworks of the main chain and the side chain are the same (common) regarding the chemical structure of the molecule. This also applies to the second embodiment described below. For example, high density polyethylene (HDPE), low density polyethylene (LDPE), linear low density polyethylene (LLDPE), ultra-low density polyethylene (ULDPE), and the like are all polymers having a repeating skeleton of a methylene group (—$CH_2$—), that is, included in a single type of material as polyethylene. Therefore, the expression of "made of a single type of material" means that the object is made of at least one material selected from the materials included in polyethylene such as HDPE, LDPE, LLDPE, and ULDPE when polyethylene is used as the single type of material in the first embodiment, for example.

The first base-material layer 11 may be a single layer (monolayer) or may have a configuration in which a plurality of layers are laminated. However, even when the configuration in which a plurality of layers are laminated is used, every one of those laminated layers needs to be made of a single type of material, but each of the layers may be made of different materials in a single type of material such as a configuration in which HDPE and LLDPE are laminated, for example. The laminated layers of the first base-material layer 11 are preferably laminated by performing attaching by heat sealing (a laminate-attaching layer is not included), but may be laminated by performing attaching by dry lamination, extrusion lamination, coextrusion lamination, and the like. The first base-material layers 11 may be laminated so as to sandwich the first applying-type gas barrier layer 13 described above. When the first applying-type gas barrier layer 13 is formed between the laminated layers of the first base-material layer 11 as above, the first applying-type gas barrier layer 13 may be sandwiched between different materials in a single type of material. For example, one layer sandwiching the first applying-type gas barrier layer 13 may be LLDPE and the other layer may be HDPE.

The first embodiment of the sheet for container according to the present invention includes the second film 2 (inner-side main-body film) that is arranged on the inner side of the first film 1 (the side of the inner portion of the sheet) described above and is partially attached to the first film 1. In other words, in the flexible container according to this embodiment including the accommodation region, the second film 2 is arranged on the inner side of the first film 1, and the accommodation region that accommodates the content to be accommodated exists on the inner side of the second film 2. The second film 2 is coated with the second applying-type gas barrier layer 23, and includes the second base-material layer 21 made of a single type of material having a heat-sealing property that is the same type of material as the first base-material layer 11.

First, the second applying-type gas barrier layer 23 is a coating layer formed by applying a material having a gas barrier property to either of the surfaces of the second base-material layer 21. A vapor depositing layer formed by vapor-depositing metal, silica, and the like is also not included in the second applying-type gas barrier layer 23, and the second applying-type gas barrier layer 23 is limited to a coating layer formed by applying a material having a gas barrier property. As the material having a gas barrier property, a material similar to that of the first applying-type gas barrier layer 13 can be used. The material used for the second applying-type gas barrier layer 23 is not limited to a material that is the same as the material used for the first applying-type gas barrier layer 13, and the material used for the first applying-type gas barrier layer 13 and the material used for the second applying-type gas barrier layer 23 may be different materials.

As with the first applying-type gas barrier layer 13 described above, the second base-material layer 21 also needs to be coated with the second applying-type gas barrier layer 23 by at least one layer. The second applying-type gas barrier layer 23 preferably has a gas barrier property similar to that of the first applying-type gas barrier layer 13, and one of the surfaces of the second base-material layer 21 may be coated with one or more materials selected from the materials having a gas barrier property described above in an overlapping manner so that a plurality of layers are formed, or both surfaces of the second base-material layer 21 may be coated with one or more layers each so that the gas barrier property thereof is increased more.

The first embodiment of the sheet for container according to the present invention includes the applying-type gas barrier layers (the first applying-type gas barrier layer 13 and the second applying-type gas barrier layer 23) described above as the gas barrier coating layers. As a result, when the flexible container in which gas is enclosed in the gas enclosing portion 5 is formed, the generation of a crack at a place near the gas enclosing portion 5 due to the bending of the film or the like hardly occurs unlike a flexible container including a vapor depositing layer as the gas barrier coating layer.

Next, the second base-material layer 21 coated with the second applying-type gas barrier layer 23 described above is a layer serving as the main part of the film made of a single type of material having a heat-sealing property that is the same type of material as the first base-material layer 11. As described above, in the sheet for container according to the present invention, the material forming the first base-material layer 11 of the first film 1 and the material forming the second base-material layer 21 of the second film 2 need to be the same type. Now, the expression of "the same type" in this embodiment means that the materials forming the layers are included in a same single type of material. This also applies to the second embodiment described below. In other words, the second base-material layer 21 in the first embodiment of the sheet for container according to the present invention is made of a material included in the same single type of material as the material forming the first base-material layer 11. This is because the entire sheet for container is made of a single type of material and the recyclability thereof increases by the configuration as above. As with the first base-material layer 11 described above, the second base-material layer 21 also may be a single layer, may have a configuration in which a plurality of layers are laminated and attached to each other, or may have a configuration in which the second applying-type gas barrier layer 23 is formed between the second base-material layers 21.

The second film 2 described above is partially attached to the first film 1 by heat sealing. The gas enclosing portion 5 described above that is partially non-attached and capable of enclosing gas therein is formed between the first film 1 and the second film 2. As described above, in the sheet for container according to the present invention, the films made of a single type of material are attached to each other by heat sealing, and the difference in properties such as the coefficient of extension is small between the films. Therefore, the peeling (delamination) of the films at a place particularly near the gas enclosing portion 5 hardly occurs. In the sheet for container according to the present invention, the sheet can be made to be thinner. As a result, the generation of wrinkles at a place near the gas enclosing portion 5 and on the end portions of the film layers can be reduced. When the generation of wrinkles is reduced, cracks (pinholes and delamination) in the film layer are suppressed, the durability of the flexible container formed with use of this sheet improves. The end portions and the like of the films are hard in a thick sheet for container, and hence it may pain when a hand touches the flexible container formed with use of a thick sheet for container as above (the grip feeling of the container is not well). However, in the sheet for container according to the present invention, the sheet can be made to be thinner, and hence the grip feeling of the flexible container formed with use of this sheet improves more.

Now, a heat sealing condition of the first film 1 and the second film 2 in the present invention only needs to be set, as appropriate, in accordance with the properties of the single type of material that is used, but a case of performing with a sealing temperature not less than 110 degrees centigrade and not more than 170 degrees centigrade, a sealing pressure not less than 0.3 MPa and not more than 1.0 MPa, and a sealing time not less than 0.1 second and not more than 10 second, for example, is exemplified.

In the first embodiment of the sheet for container according to the present invention, when the sheet for container is formed by the first film 1 and the second film 2, by attaching at least some parts of the peripheral portions of the second film 2 to each other, a bag is formed and the accommodation region that accommodates the content to be accommodated is formed. Heat sealing, ultrasonic sealing, an adhesion layer, and the like can be used for the attaching, but the bag is preferably formed by performing attaching by the heat sealing from the viewpoint of recyclability. As a further modified example of the first embodiment, there may be a configuration including the third film 3 (inner container film). The third film 3 is arranged on the inner side of the second film 2 so that the peripheral portions thereof are slightly on the inner side than the first film 1 and the second film 2, formed into a bag by attaching at least some parts of the peripheral portions thereof to each other, and is an inner container forming the accommodation region. The third film 3 includes a third base-material layer 31 made of a single type of material having a heat-sealing property that is the same type of material as the first base-material layer 11 of the first film 1 and the second base-material layer 21 of the second film 2. The third film 3 has the accommodation region that accommodates the content to be accommodated described above formed on the inner side thereof, and is at least partially non-attached to the first film 1 and the second film 2. The third film 3 includes an opening portion from which the content to be accommodated can be accommodated and discharged. The third base-material layer 31 of the third film 3 also may be a single layer, or may have the configuration in which a plurality of layers are laminated as with the first base-material layer 11 and the second base-material layer 21 described above. The third film 3 can be attached with use of heat sealing, ultrasonic sealing, an adhesion layer, and the like, but is preferably formed into a bag by the attaching by heat sealing from the viewpoint of recyclability.

The third base-material layer 31 described above may be coated with the third applying-type gas barrier layer 33, as necessary. The third applying-type gas barrier layer 33 is also formed by applying a material having a gas barrier property similar to that of the first applying-type gas barrier layer 13 and the second applying-type gas barrier layer 23 described above. In order to increase the gas barrier property more, one or more materials selected from the materials having a gas barrier property described above may be applied to one of the surfaces of the third base-material layer 31 in an overlapping manner so that a plurality of layers are formed, or may be applied to both surfaces of the third base-material layer 31. Alternatively, the third applying-type gas barrier layer 33 may be formed between the laminated layers of the third base-material layer 31.

In the sheet for container according to this embodiment including the third film 3, as described above, the inner container is obtained by forming a bag by attaching at least some parts of the peripheral portions of the third film 3 to each other, and the accommodation region that accommodates the content to be accommodated is formed in the inner container. A spout and the like may be provided in the third film 3 as an opening portion. The third film 3 and the second film 2 are non-attached throughout the films, or at least some parts of the peripheral portions of the second film 2 and the third film 3 are in a state of being attached to each other. As a result, when the content to be accommodated is used, the inner container is easily decreased in size, the content to be accommodated is easily discharged till the end, and the rigidity of the main body of the container is maintained by the gas enclosing portion 5 formed between the first film 1 and the second film 2. However, even when the third film 3 and the second film 2 are non-attached throughout the films, the third film 3 serving as the inner container is preferably held on the inner side of the second film 2. An outside-air introducing portion that introduces outside air to a place between the inner container and the film layer covering the inner container may be provided between the third film 3 and the second film 2 so that the decrease in size described above is easily obtained.

The sheet for container according to the present invention includes the first film 1 and the second film 2, and the third film 3 if necessary in the order from the outermost layer as described above, and the thickness of entirety of the layered films before the gas is enclosed is preferably not less than 20 μm and more preferably not less than 30 μm, and preferably not more than 300 μm and more preferably not more than 200 μm. The thickness of each film is preferably not less than 5 μm and more preferably not less than 10 μm, and preferably not more than 80 μm and more preferably not more than 50 μm. By forming the flexible container with use of the sheet for container according to the present invention as above, the flexible container that is extremely thin while having the rigidity of the main body of the container can be obtained.

In the sheet for container according to the present invention, the base-material layers of all of the films need to be made of a single type of material as described above, and materials other than the single type of material used in those configurations need to be substantially unincluded in order to increase the recyclability. The expression of "substantially unincluded" in the present invention means that the mass ratio is less than 1%, preferably less than 0.5%, and most preferably 0% of the film.

Now, with reference to FIG. 4 to FIG. 10, modified examples of the configuration of the film layers and the configuration between the film layers in the first embodiment of the sheet for container according to the present invention are described in more detail.

Various modifications of the configuration of the film layers in the first embodiment of the sheet for container according to the present invention can be made in accordance with properties required when the flexible container is formed, the type of the content to be accommodated, and the like. For example, as illustrated in FIG. 4 to FIG. 6, a configuration in which the gas enclosing portion 5 is formed so as to be sandwiched between the first applying-type gas barrier layer 13 of the first film 1 and the second applying-type gas barrier layer 23 of the second film 2 is described as one modified example. The expression of "formed so as to be sandwiched" in this embodiment means that the gas enclosing portion 5 is formed between the two layers directly faced by the gas enclosing portion 5, and does not mean the arrangement relationship with layers other than the layers directly facing the gas enclosing portion 5.

Figure 5A:
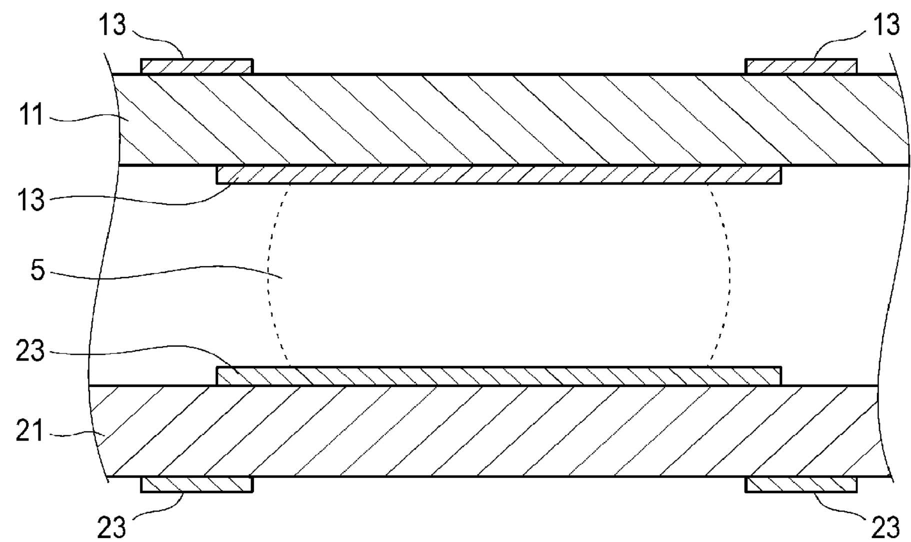
FIG. 5A illustrates the films in a state of being separated from each other.
Figure 5B:
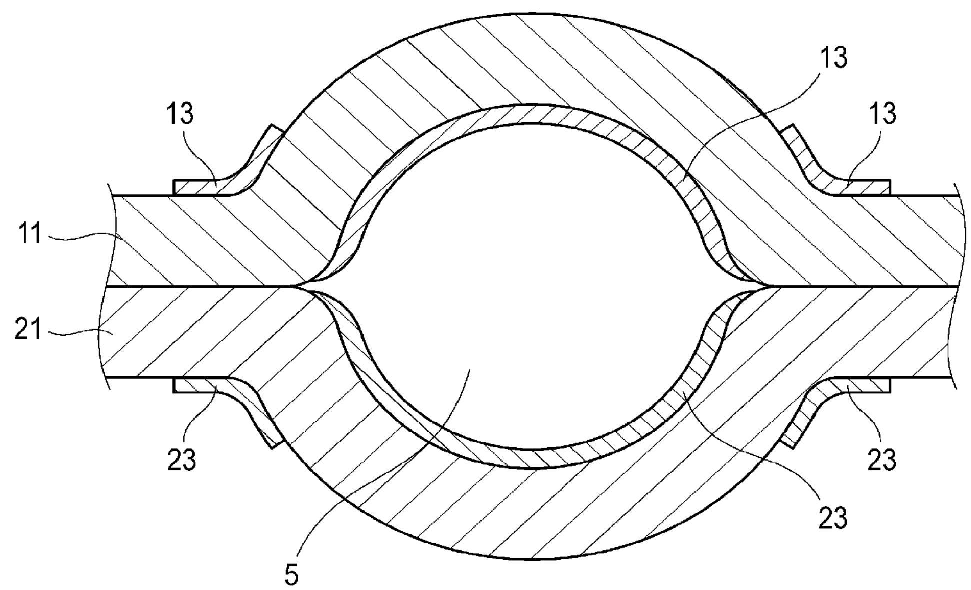
FIG. 5B illustrates a state in which the films in FIG. 5A are attached to each other and gas is enclosed in a gas enclosing portion.
Figure 6:
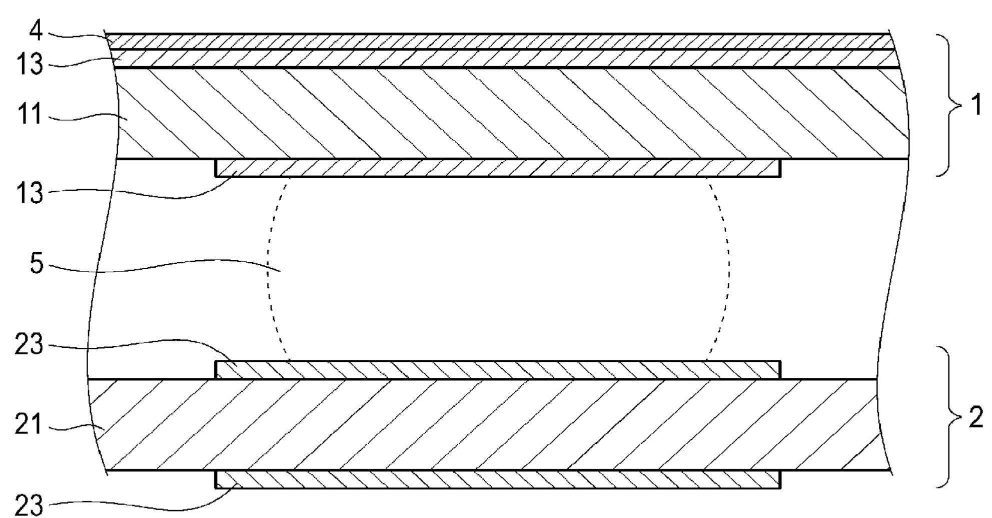
FIG. 6 is a cross-sectional view illustrating another modified example of the sheet for container according to the first embodiment of the present invention.

In the modified example from FIG. 4 to FIG. 6, the first applying-type gas barrier layer 13 and the second applying-type gas barrier layer 23 directly facing the gas enclosing portion 5 are both applied to the following portions in the surfaces of the first base-material layer 11 and the second base-material layer 21 facing each other. The portions are portions other than heat sealing portions at which the film attaching of the first film 1 and the second film 2 is performed by heat sealing. Now, the first applying-type gas barrier layer 13 and the second applying-type gas barrier layer 23 directly facing the gas enclosing portion 5 are preferably applied so that the front and rear surfaces of the first applying-type gas barrier layer 13 and the second applying-type gas barrier layer 23 completely overlap each other at the borders with the heat sealing portions when the films are attached to each other. However, when it is difficult to perform the applying so that the front and rear surfaces of the first applying-type gas barrier layer 13 and the second applying-type gas barrier layer 23 completely overlap each other, the following configuration may be used as illustrated in FIG. 5A and FIG. 5B. In the configuration, both surfaces of the first base-material layer 11 are coated with the first applying-type gas barrier layers 13, and both surfaces of the second base-material layer 21 are coated with the second applying-type gas barrier layers 23. The coating of the first applying-type gas barrier layer 13 and the second applying-type gas barrier layer 23 on the sides of the surfaces on which the gas enclosing portion 5 is not formed is performed on at least regions that stride over the end portions (the borders with the heat sealing portions) of the first applying-type gas barrier layer 13 and the second applying-type gas barrier layer 23 on the sides of the surfaces on which the gas enclosing portion 5 is formed. This is because, by the configuration as above, the risk of gas leak from the gas enclosing portion 5 due to applying misalignment between the first applying-type gas barrier layer 13 and the second applying-type gas barrier layer 23 can be reduced more when the gas is enclosed in the gas enclosing portion 5 (FIG. 5B).

As described above, by the configuration in which the first applying-type gas barrier layer 13 of the first film 1 and the second applying-type gas barrier layer 23 of the second film 2 are applied to portions other than the heat sealing portions in the first base-material layer 11 and the second base-material layer 21, the applying-type gas barrier layers are also applied to regions forming the gas enclosing portion 5. Therefore, the first applying-type gas barrier layer 13 and the second applying-type gas barrier layer 23 are not attached to each other by heat sealing. As a result, the applying-type gas barrier layers function as a non-attaching agent (so-called adhesion inhibiting agent), and the gas enclosing portion 5 can also be formed with use of a mold the surface of which is entirely a flat plate.

As illustrated in FIG. 6, both surfaces of the first base-material layer 11 can be coated (for example, the entire surface besides the heat sealing portions can be coated) with the first applying-type gas barrier layers 13, and both surfaces of the second base-material layer 21 can be coated (for example, the entire surface besides the heat sealing portions can be coated) with the second applying-type gas barrier layers 23. Alternatively, a configuration in which either the first film 1 or the second film 2 has a base-material layer the surfaces of which are both coated with the applying-type gas barrier layers may be used. By the configuration in which coating of the applying-type gas barrier layers is performed by a plurality of layers, a configuration in which the gas enclosed in the gas enclosing portion 5 leaks less easily (configuration in which the gas barrier performance is improved more) is obtained, and hence the configuration is extremely suitable.

Now, in the modified example described above, a protection layer that protects the base-material layer and the like, and the function layer 4 that functions as a printing layer or the like may be further formed. As illustrated in FIG. 4 and FIG. 6, for example, the coating of the function layer 4 may be performed on the outer surface side of the first film 1 by applying and the like so that the function layer 4 is formed to be integrated with the first film 1, but may be formed between other layers and the like by applying, an adhesive agent, and the like, and only needs to be formed, as appropriate, in consideration of friction and the like.

The function layer 4 can be formed by offset printing, screen printing, gravure printing, and flexographic printing, for example, and may be a medium printing layer that is a colorless printing layer and has the function of a protection layer. The medium printing layer is preferably formed on the outer surface side of the first film 1. This is because the effect of preventing deterioration of the first applying-type gas barrier layer 13, the first base-material layer 11, and the like due to the external environment increases by the configuration as above.

Figure 7:
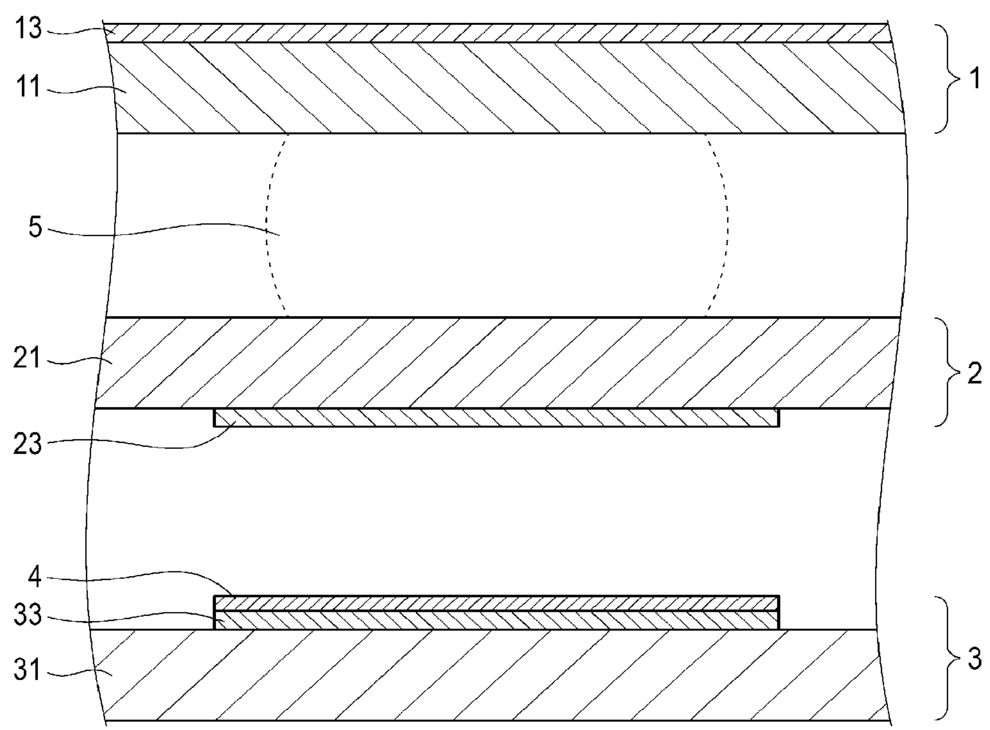
FIG. 7 is a cross-sectional view illustrating another modified example of the sheet for container according to the first embodiment of the present invention.
Figure 8:
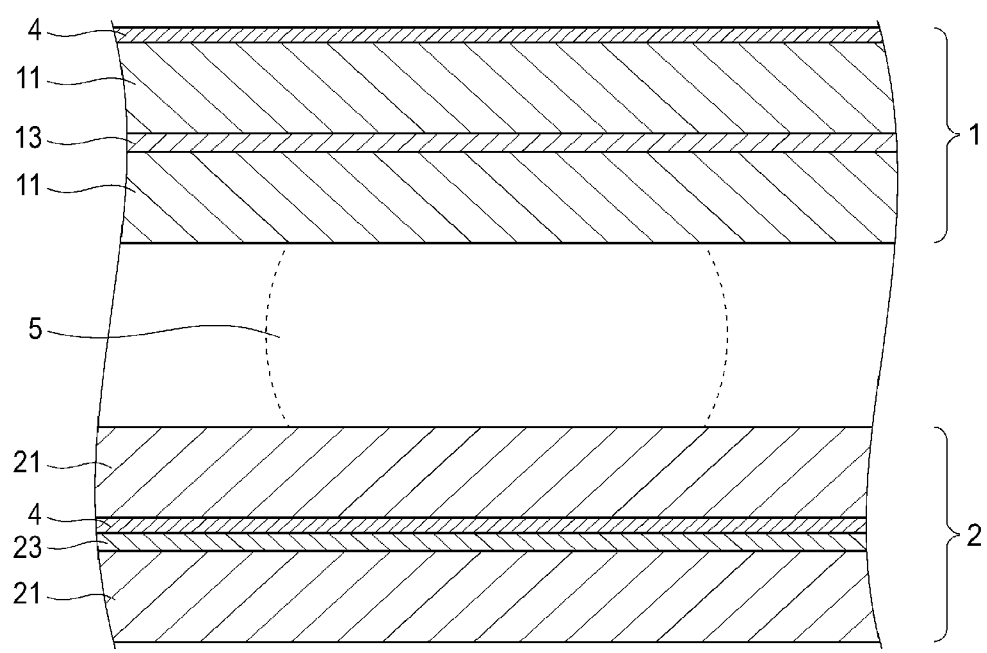
FIG. 8 is a cross-sectional view illustrating another modified example of the sheet for container according to the first embodiment of the present invention.
Figure 9:
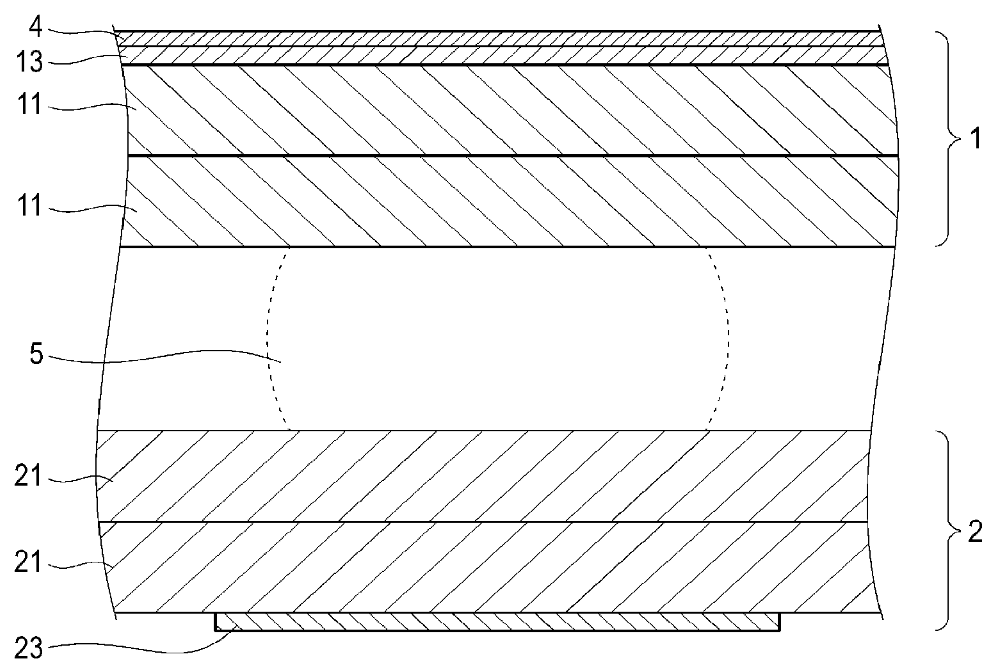
FIG. 9 is a cross-sectional view illustrating another modified example of the sheet for container according to the first embodiment of the present invention.

A film configuration in which the gas enclosing portion 5 is formed so as to be sandwiched between the first base-material layer 11 of the first film 1 and the second base-material layer 21 of the second film 2 as illustrated in FIG. 7 to FIG. 9, for example, is also described as another modified example. By the configuration as above, the surfaces of those base-material layers that sandwich the gas enclosing portion 5 can be entirely sealed by heat, and hence the gas enclosing portion 5 can be freely formed with use of a mold in which a groove portion having a desired shape is formed. By the configuration as above, on the surfaces of those base-material layers on the opposite side of the surfaces that sandwich the gas enclosing portion 5, coating of the applying-type gas barrier layers can be performed in a wider range than the region of the gas enclosing portion 5. Therefore, the risk of gas leak from the gas enclosing portion 5 can be reduced even more. However, also in this modified example, the usage of the non-attaching agent (so-called adhesion inhibiting agent) on the surfaces forming the gas enclosing portion 5 is not limited.

As illustrated in FIG. 8, a film configuration in which the first base-material layer 11 is formed by laminating a plurality of layers made of a single type of material, the first applying-type gas barrier layer 13 is formed between the laminated layers of the first base-material layer 11, the second base-material layer 21 is also formed by laminating a plurality of layers made of a single type of material that is the same type of material as the first base-material layer 11, and the second applying-type gas barrier layer 23 is formed between the laminated layers of the second base-material layer 21 is also described as another modified example. Alternatively, a configuration in which either the first film 1 or the second film 2 includes the applying-type gas barrier layer between the laminated layers of the base-material layer may be used. By the configuration as above, the applying-type gas barrier layer formed between the laminated layers of the base-material layer does not necessarily need to be partially applied, and hence the application becomes easier.

As illustrated in FIG. 9, a configuration in which a surface of the first base-material layer 11, which is formed by laminating a plurality of layers made of a single type of material, on the side on which the gas enclosing portion 5 is not formed is coated with the first applying-type gas barrier layer 13, and a surface of the second base-material layer 21, which is formed by laminating the plurality of layers made of a single type of material that is the same type of material as the first base-material layer 11, on the side on which the gas enclosing portion 5 is not formed is coated with the second applying-type gas barrier layer 23 is also described as another modified example. By the configuration as above, the rigidity of the main body of the container can be increased more.

Figure 10:
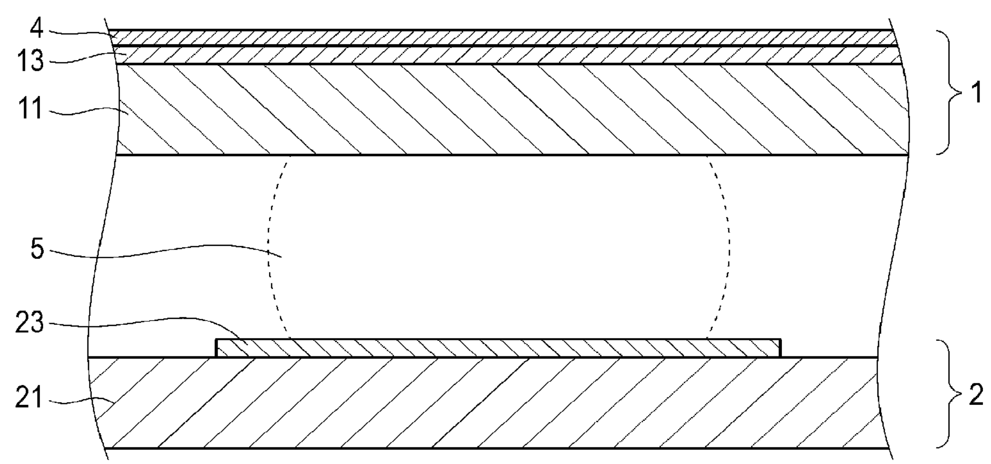
FIG. 10 is a cross-sectional view illustrating another modified example of the sheet for container according to the first embodiment of the present invention.

As in an modified example illustrated in FIG. 10, the first applying-type gas barrier layer 13 may be applied to the outer surface side of the first base-material layer 11, that is, the surface side thereof on which the gas enclosing portion 5 is not formed, the second applying-type gas barrier layer 23 may be applied to the outer surface side of the second base-material layer 21, that is, the surface side thereof facing the first base-material layer 11, and the gas enclosing portion 5 may be formed so as to be sandwiched between the first base-material layer 11 and the second applying-type gas barrier layer 23.

As illustrated in FIG. 4 to FIG. 6, for both of the first film 1 and the second film 2, when the applying-type gas barrier layer is partially applied to the gas enclosing portion 5 side, the formation of the applying-type gas barrier layer over the entire periphery of the gas enclosing portion 5 tends to be slightly difficult due to misalignment when the first film 1 and the second film 2 are attached to each other. However, as in the modified example in FIG. 10, by applying the applying-type gas barrier layer on only a surface on one of the sides with which the gas enclosing portion 5 is formed, the tolerance for the misalignment described above increases and the applying-type gas barrier layer also serves as the adhesion inhibiting agent. Therefore, the heat sealing of the first film 1 and the second film 2 and the formation of the gas enclosing portion 5 becomes easier. In the embodiment in which the second film 2 is formed into a bag and the accommodation region that accommodates the content to be accommodated is directly formed in the second film 2 (the third film 3 is not included), the applying-type gas barrier layer is not formed on the surface forming the accommodation region of the second film 2. Therefore, the content to be accommodated does not come into contact with the applying-type gas barrier layer, and hence the selectivity of the applying-type gas barrier layer can be widened.

The inner surface side (gas enclosing portion side) of the first base-material layer 11, that is, the surface side facing the second base-material layer 21 may be coated with the first applying-type gas barrier layer 13, the inner surface side (accommodation region side) of the second base-material layer 21, that is, the surface side on which the gas enclosing portion 5 is not formed may be coated with the second applying-type gas barrier layer 23, and the gas enclosing portion 5 may be formed so as to be sandwiched between the first applying-type gas barrier layer 13 and the second base-material layer 21.

Also in this case, as with the modified example in FIG. 10, by coating only one side of the surfaces forming the gas enclosing portion 5 with the applying-type gas barrier layer, the tolerance for the misalignment described above increases and the applying-type gas barrier layer also serves as the adhesion inhibiting agent. Therefore, the heat sealing of the first film 1 and the second film 2 and the formation of the gas enclosing portion 5 becomes easier. When a configuration including the third film 3 on the inner side of the second film 2 and the third film 3 becomes the inner container by being formed into a bag is used, the content to be accommodated does not come into contact with the applying-type gas barrier layer. Thus, the selectivity of the applying-type gas barrier layer can be widened.

The modified example illustrated in FIG. 7 illustrates a case of having a film configuration further including the third film 3 arranged on the inner side of the second film 2 in addition to the first film 1 and the second film 2. As described above, in the first embodiment of the sheet for container according to the present invention, the third film 3 may be included as described above for all of the modified examples. The third film 3 includes the third base-material layer 31 made of a single type of material that is the same type of material as the first base-material layer 11 of the first film 1 and the second base-material layer 21 of the second film 2. The third film 3 has an accommodation region that accommodates the content to be accommodated formed on the inner side thereof, and is at least partially non-attached to the first film 1 and the second film 2. At least one of the surfaces of the third base-material layer 31 may be coated with the third applying-type gas barrier layer 33. When the second film 2 and the third film 3 are partially attached to each other by heat sealing, the third applying-type gas barrier layer 33 is applied to portions other than the heat sealing portions that are the film attaching portions.

The function layer 4 may be also further formed in the modified examples described above. In the modified example in FIG. 7, the surface of the third film 3 facing the second film 2 is coated with the third applying-type gas barrier layer 33, and the function layer 4 is formed to be integrated with the third film 3 by being formed on the third applying-type gas barrier layer 33 by being applied thereto. In the modified example in FIG. 8, the function layer 4 is formed on the outer surface side of the first film 1 and between the laminated layers of the second base-material layer 21 of the second film 2 so as to be integrated with the films. The configuration as that illustrated in FIG. 8 is more preferred because the function layer 4 does not necessarily need to be partially formed on portions other than the heat sealing portions. In the modified examples in FIG. 9 and FIG. 10, as with the modified examples in FIG. 4 and FIG. 6, the function layer 4 is formed on the outer surface side of the first film 1 so as to be formed to be integrated with the first film 1.

Second Embodiment

Next, with reference to FIG. 11, the second embodiment relating to a film layer configuration of the sheet for container according to the present invention is described in detail.

The second embodiment of the sheet for container according to the present invention includes the first film 1 (outer-side main-body film) as the outermost film thereof. The first film 1 includes the first base-material layer 11 made of a single type of material having a heat-sealing property and a gas barrier property.

Now, also in the second embodiment of the sheet for container according to the present invention, the first film 1 may include a coating layer the thickness of which is less than 50% of the thinnest monolayer of the base-material layer such as a function layer having a function of a protection layer described below in addition to the base-material layer. All of the films above more preferably have a configuration in which layers other than the function layer and the base-material layer are not included, and the function layer more preferably has a thickness that is less than 20% of the thinnest monolayer of the base-material layer. This also applies to the second film 2 and a third film 3 described below.

First, the first base-material layer 11 is a layer that is the main part of the films made of a single type of material having both of a heat-sealing property and a gas barrier property. The material having both of the heat-sealing property and the gas barrier property is not particularly limited, but suitable examples include ethylene-vinyl alcohol copolymer (EVOH) and polyvinyl alcohol resin (PVA), and the like.

The gas barrier property of the first base-material layer 11 is preferably not more than 100 mL/m$^2$·day·atm (measured by a method in compliance with JIS K7126 by OX-TRAN2/21ML manufactured by MOCON Inc.), and is more preferably not more than 10 mL/m$^2$·day·atm at 23 degrees centigrade and 65% RH. In order to increase the gas barrier property, the first base-material layer 11 may have a configuration in which one or more materials selected from the abovementioned materials are laminated.

The second embodiment of the sheet for container according to the present invention includes the second film 2 (inner-side main-body film) on the inner side of the first film 1. The second film 2 includes the second base-material layer 21 made of a single type of material having both of the heat-sealing property and the gas barrier property. The second base-material layer 21 is made of a single type of material having both of the heat-sealing property and the gas barrier property that is the same type of material as the first base-material layer 11 in order to increase the recyclability thereof. As with the first base-material layer 11 described above, a configuration in which one or more materials selected from the abovementioned materials are laminated may be used in order to improve the gas barrier property more.

The second embodiment of the sheet for container according to the present invention is suitable because, by forming the first base-material layer 11 and the second base-material layer 21 with a single type of material having both of the heat-sealing property and the gas barrier property, a case where one of the surfaces of the base-material layers needs to be coated with the gas barrier layer does not occur.

In the second embodiment of the sheet for container according to the present invention, as with the first embodiment of the sheet for container according to the present invention, the second film 2 is partially attached to the first film 1 by heat sealing. When the first film 1 and the second film 2 are attached to each other, the gas enclosing portion 5 described above that is partially non-attached and capable of enclosing gas therein is formed between the first film 1 and the second film 2.

Also in the second embodiment of the sheet for container according to the present invention, when the sheet for container is formed by the first film 1 and the second film 2, by attaching at least some parts of the peripheral portions of the second film 2 to each other, a bag is formed and the accommodation region that accommodates the content to be accommodated is formed. Heat sealing, ultrasonic sealing, an adhesion layer, and the like can be used for the attaching, but the bag is preferably formed by performing attaching by the heat sealing from the viewpoint of recyclability. As a modified example of the second embodiment, there may be a configuration including the third film 3 (inner container film). The third film 3 is arranged on the inner side of the second film 2 so that the peripheral portions thereof are slightly on the inner side than the first film 1 and the second film 2, formed into a bag by attaching at least some parts of the peripheral portions thereof to each other, and is an inner container forming the accommodation region. The third film 3 includes the third base-material layer 31 made of a single type of material that is the same type of material as the first base-material layer 11 of the first film 1 and the second base-material layer 21 of the second film 2, and has both of the heat-sealing property and the gas barrier property. The third film 3 has the accommodation region that accommodates the content to be accommodated formed on the inner side thereof, and is at least partially non-attached to the first film 1 and the second film 2. The third film 3 may include an opening portion from which the content to be accommodated can be accommodated and discharged, and the opening portion may be a spout and the like. The third base-material layer 31 also may be a single layer, or may have the configuration in which a plurality of layers are laminated as with the first base-material layer 11 and the second base-material layer 21 described above. The third film 3 can be attached with use of heat sealing, ultrasonic sealing, an adhesion layer, and the like, but is preferably formed into a bag by the attaching by heat sealing from the viewpoint of recyclability.

In the second embodiment of the sheet for container according to the present invention, the function layer 4 is formed on at least one of the outer surface (the surface on the side opposite to the surface facing the second film 2) of the first base-material layer 11 and the outer surface (the surface on the side opposite to the surface facing the first film 1) of the second base-material layer 21 in order to protect the base-material layers from outside air (water vapor and the like), impact, and the like. In particular, a configuration in which the function layer 4 is formed on the outer surface of the first base-material layer 11 is more preferred.

When the flexible container is formed with use of the sheet for container according to the present invention, the function layer 4 in the second embodiment is a layer having a function of protecting the base-material layers and the like from impact from the outside, the water vapor included in the outside air, water, and the like. The gas barrier property only needs to be a layer having a barrier performance capable of at least preventing the permeation of water vapor, and does not necessarily need to have a barrier property against gas other than water vapor such as oxygen. As the function layer 4, a medium printing layer that is a colorless printing layer, for example, is described to be suitable. The function layer 4 in the second embodiment is not limited to a layer formed by applying, and may be a layer formed by vapor deposition or by an adhesive agent. The function layer 4 may also be formed on the inner surface (the surface facing the second film 2) of the first film 1 and the inner surface (the surface facing the first film 1) of the second film 2.

For example, a configuration in which the function layer 4 is formed on the outer surface of the first base-material layer 11 of the first film 1 so as to be integrated with the first film 1 and the gas enclosing portion 5 is formed between the first film 1 and the second film 2 as illustrated in FIG. 11, a configuration further including the third film 3 in addition to the configuration illustrated in FIG. 11, and the like are exemplified as the modified examples. In the second embodiment of the sheet for container according to the present invention, the configuration in which the function layer 4 is formed on the outer surface of the first base-material layer 11 as described above is more preferred.

In the second embodiment of the sheet for container according to the present invention, as the function layer 4, a printing layer may be further formed in addition to the protection layer having a function of protecting the base-material layer and the like. As with the first embodiment of the sheet for container according to the present invention, the printing layer can be formed by offset printing, screen printing, gravure printing, flexographic printing, and the like, and the region of formation thereof is not particularly limited.

The base-material layers are made of a single type of material (mono-material), and hence the sheet for container according to the present invention including embodiments as above has a higher recyclability and can be made to be thinner than the sheet for container of the related art. The gas enclosing portion is included, and hence the container formed with use of the sheet for container according to the present invention has a rigidity while being a flexible container. The plurality of films including the base-material layers made of a single type of material are film-attached to each other by heat sealing, and hence the peeling (delamination) of the films and the generation of a crack due to film bending and the like at a place near the gas enclosing portion and the like as seen in the vapor depositing layer hardly ever occurs. Therefore, gas leakage from the gas enclosing portion hardly ever occurs, and the function (the rigidity and the like) as the container is maintained to a high degree.

In the recycling process of the flexible container formed by the sheet for container according to the present invention, as described above, the main body of the container is crushed into a small size after gas is removed from the gas enclosing portion 5. Then, the opening portion (the spout and the like), the cap, and the like are separated from each other, as necessary, and the main body of the container is washed and shredded. As a result, recycled materials can be easily obtained.

The embodiments described above include the following technical concept.

<1> A sheet for container to be used in a flexible container, the sheet for container having a plurality of films layered in the sheet for container, the sheet for container comprising:

a first film including a first base-material layer, which is coated with a first applying-type gas barrier layer and made of a single type of material having a heat-sealing property; and a second film including a second base-material layer, which is coated with a second applying-type gas barrier layer and made of a single type of material that is a same type of material as the first base-material layer, wherein:

the first film and the second film are attached to each other by heat sealing; and a gas enclosing portion, which is partially non-attached and in which gas is able to be enclosed, is formed between the first film and the second film.

<2> The sheet for container according to <1>, wherein the gas enclosing portion is formed so as to be sandwiched between the first applying-type gas barrier layer of the first film and the second applying-type gas barrier layer of the second film.

<3> The sheet for container according to <2>, wherein each of surfaces of the first base-material layer is coated with the first applying-type gas barrier layer, and/or each of surfaces of the second base-material layer is coated with the second applying-type gas barrier layer.

<4> The sheet for container according to <1>, wherein the gas enclosing portion is formed so as to be sandwiched between the first base-material layer of the first film and the second base-material layer of the second film.

<5> The sheet for container according to <4>, wherein:

the first base-material layer has a configuration in which a plurality of layers made of the single type of material are laminated, and the first applying-type gas barrier layer is formed between the laminated layers of the first base-material layer; and/or the second base-material layer has a configuration in which a plurality of layers made of the single type of material that is a same type of material as the first base-material layer are laminated, and the second applying-type gas barrier layer is formed between the laminated layers of the second base-material layer.

<6> The sheet for container according to <1>, wherein:

a surface of the first base-material layer on a side of the first base-material layer on which the gas enclosing portion is not formed is coated with the first applying-type gas barrier layer;

a surface of the second base-material layer on a side of the second base-material layer facing the first base-material layer is coated with the second applying-type gas barrier layer; and the gas enclosing portion is formed so as to be sandwiched between the first base-material layer and the second applying-type gas barrier layer.

<7> The sheet for container according to <1>, wherein:

a surface of the first base-material layer on a side of the first base-material layer facing the second base-material layer is coated with the first applying-type gas barrier layer;

a surface of the second base-material layer on a side of the second base-material layer on which the gas enclosing portion is not formed is coated with the second applying-type gas barrier layer; and the gas enclosing portion is formed so as to be sandwiched between the first applying-type gas barrier layer and the second base-material layer.

<8> The sheet for container according to any one of <1> to <7>, wherein the first applying-type gas barrier layer of the first film and the second applying-type gas barrier layer of the second film are applied to a portion other than heat sealing portions attached to each other by the heat sealing.

<9> The sheet for container according to any one of <1> to <8>, wherein the first base-material layer and the second base-material layer are made of one type selected from polyethylene, polypropylene, or amorphous polyethylene terephthalate.

<10> The sheet for container according to any one of <1> to <9>, wherein the first applying-type gas barrier layer and the second applying-type gas barrier layer are made of at least one type selected from a group including polyvinylidene chloride, ethylene-vinyl alcohol copolymer, an organic (ethylene-vinyl alcohol copolymer resin based)/inorganic (plate-like filler) nanocomposite material, an organic (vinyl acetate based)/inorganic (siloxane polymer) hybrid-type material, polyvinyl alcohol, a copolymer of polyvinyl alcohol, acrylic acid, and methyl methacrylate, and hydroxy polyurethane.

<11> The sheet for container according to any one of <1> to <10>, wherein a gas barrier property of the first applying-type gas barrier layer and the second applying-type gas barrier layer measured by a method in compliance with JIS K7126 is not more than 100 $mL/m^2 \cdot day \cdot atm$ and preferably not more than 10 $mL/m^2 \cdot day \cdot atm$ at 23 degrees centigrade and 65% RH.

<12> A sheet for container to be used in a flexible container, the sheet for container having a plurality of films layered in the sheet for container, the sheet for container comprising:

a first film including a first base-material layer made of a single type of material having a heat-sealing property and a gas barrier property; and a second film including a second base-material layer made of a single type of material that is a same type of material as the first base-material layer, wherein:

the first film and the second film are attached to each other by heat sealing;

a gas enclosing portion, which is partially non-attached and in which gas is able to be enclosed, is formed between the first film and the second film; and a function layer that protects the first base-material layer or the second base-material layer is formed on at least one of an outer surface of the first film and an outer surface of the second film.

<13> The sheet for container according to <12>, wherein the first base-material layer and the second base-material layer are made of an ethylene-vinyl alcohol copolymer or a polyvinyl alcohol resin.

<14> The sheet for container according to <12> or <13>, wherein a gas barrier property of the first base-material layer and the second base-material layer measured by a method in compliance with JIS K7126 is not more than 100 mL/m$^2$·day·atm and preferably not more than 10 mL/m$^2$·day·atm at 23 degrees centigrade and 65% RH.

<15> The sheet for container according to any one of <12> to <14>, wherein the function layer is a medium printing layer.

<16> The sheet for container according to any one of <1> to <15>, wherein:

the first film has a configuration that does not include layers other than the first applying-type gas barrier layer, the function layer, and the first base-material layer; and the second film has a configuration that does not include layers other than the second applying-type gas barrier layer, the function layer, and the second base-material layer.

<17> The sheet for container according to any one of <1> to <16>, wherein the first applying-type gas barrier layer, the second applying-type gas barrier layer, and the function layer each have a thickness that is less than 20% of a thinnest monolayer of the first base-material layer or the second base-material layer.

<18> The sheet for container according to any one of <1> to <17>, wherein the first film and the second film each have a configuration that does not include a vapor depositing layer.

<19> The sheet for container according to any one of <1> to <18>, wherein: a thickness of entirety of the layered films of the sheet for container before the gas is enclosed in the gas enclosing portion is not less than 20 μm and preferably not less than 30 μm, and is not more than 300 μm and preferably not more than 200 μm; and a thickness of each of the first film and the second film is not less than 5 μm and preferably not less than 10 μm, and is not more than 80 μm and preferably not more than 50 μm.

<20> A flexible container formed with use of the sheet for container according to any one of <1> to <19>, wherein:

the second film is arranged on an inner side of the first film;

an accommodation region that accommodates a content to be accommodated is included on an inner side of the second film; and gas is enclosed in the gas enclosing portion.

<21> The flexible container according to <20>, further comprising a third film including a third base-material layer made of a single type of material that is a same type of material as the first base-material layer of the first film and the second base-material layer of the second film, wherein:

a bag is formed by attaching at least some parts of peripheral portions of the third film to each other; and the third film is an inner container forming the accommodation region.

<22> The flexible container according to <21>, wherein the third film is at least partially non-attached to the first film and the second film.

<23> The flexible container according to <21> or <22>, wherein the third film is formed into a bag by heat sealing and forms the inner container.

<24> The flexible container according to <20>, wherein the accommodation region that directly accommodates the content to be accommodated in the second film is formed by forming a bag by attaching at least some parts of peripheral portions of the second film to each other.

<25> The flexible container according to <24>, wherein the second film is formed into a bag by heat sealing.

<26> The flexible container according to any one of <20> to <25>, wherein an internal pressure of the gas enclosing portion in which the gas is enclosed is not less than 10 kPa and not more than 500 kPa.

<27> The flexible container according to any one of <20> to <26>, wherein:

the second film is arranged so as to surround the accommodation region; and the gas enclosing portion is arranged on an outer side of the accommodation region and between the first film and the second film.

<28> A flexible-container-packed product, comprising:

the flexible container according to any one of <20> to <27>; and the content to be accommodated that is accommodated in the accommodation region of the flexible container.

REFERENCE SIGNS LIST

1 First film
2 Second film
3 Third film
4 Function layer
5 Gas enclosing portion
11 First base-material layer
13 First applying-type gas barrier layer
21 Second base-material layer
23 Second applying-type gas barrier layer
31 Third base-material layer
33 Third applying-type gas barrier layer
101 Bottom gusset portion
102 Top gusset portion
103 Spout
105 Gas introducing portion

The invention claimed is:

1. A flexible container, comprising:

a sheet that forms the flexible container, wherein:

the sheet includes:

a plurality of films layered in the sheet comprising:

a first film including a first base-material layer that is coated with a first gas barrier layer, the first base-material layer being made of a single material having a heat-sealing property or being made of materials having the heat-sealing property, all the materials having a common main chain and a common side chain, and a second film including a second base-material layer that is coated with a second gas barrier layer, the second base-material being made of a single material that is the same single material as the first base-material layer or being made of materials that are the same materials as the first base-material layer;

the first film and the second film are attached to each other by heat sealing;

a gas enclosing portion, which is partially non-attached and in which gas is able to be enclosed, is formed between the first film and the second film;

the second film is arranged on an inner side of the first film;

an accommodation region that accommodates a content to be accommodated is included on an inner side of the second film; and gas is enclosed in the gas enclosing portion.

2. The sheet according to claim 1, wherein the gas enclosing portion is formed so as to be sandwiched between the first gas barrier layer of the first film and the second gas barrier layer of the second film.

3. The sheet according to claim 2, wherein each of surfaces of the first base-material layer is coated with the first gas barrier layer, and/or each of surfaces of the second base-material layer is coated with the second gas barrier layer.

4. The sheet according to claim 1, wherein the gas enclosing portion is formed so as to be sandwiched between the first base-material layer of the first film and the second base-material layer of the second film.

5. The sheet according to claim 4, wherein:

the first base-material layer has a configuration in which a plurality of layers made of the materials are laminated, and the first gas barrier layer is formed between the laminated layers of the first base-material layer; and/or the second base-material layer has a configuration in which a plurality of layers made of the same materials as the first base-material layer are laminated, and the second gas barrier layer is formed between the laminate layers of the second base-material layer.

6. The sheet according to claim 1, wherein:

a surface of the first base-material layer on a side of the first base-material layer on which the gas enclosing portion is not formed is coated with the first gas barrier layer;

a surface of the second base-material layer on a side of the second base-material layer facing the first base-material layer is coated with the second gas barrier layer; and the gas enclosing portion is formed so as to be sandwiched between the first base-material layer and the second gas barrier layer.

7. The sheet according to claim 1, wherein:

a surface of the first base-material layer on a side of the first base-material layer facing the second base-material layer is coated with the first gas barrier layer;

a surface of the second base-material layer on a side of the second base-material layer on which the gas enclosing portion is not formed is coated with the second gas barrier layer; and the gas enclosing portion is formed so as to be sandwiched between the first gas barrier layer and the second base-material layer.

8. The sheet according to claim 1, wherein the first gas barrier layer of the first film and the second gas barrier layer of the second film are applied to a portion other than heat sealing portions attached to each other by the heat sealing.

9. The sheet according to claim 1, wherein:

the first film has a configuration that does not include layers other than the first gas barrier layer and the first base-material layer; and the second film has a configuration that does not include layers other than the second gas barrier layer and the second base-material layer.

10. The sheet according to claim 1, wherein the first gas barrier layer and the second gas barrier layer each have a thickness that is less than 20% of a thinnest monolayer of the first base-material layer or the second base-material layer.

11. The sheet according to claim 1, wherein the first film and the second film each have a configuration that does not include a vapor depositing layer.

12. The flexible container according to claim 1, further comprising a third film including a third base-material layer made of a single material that is the same single material as the second base-material layer or made of materials that are the same materials as the second base-material layer, wherein:

a bag is formed by attaching at least some parts of peripheral portions of the third film to each other; and the third film is an inner container forming the accommodation region.

13. The flexible container according to claim 12, wherein the third film is at least partially non-attached to the first film and the second film.

14. The flexible container according claim 1, wherein the accommodation region that directly accommodates the content to be accommodated in the second film is formed by forming a bag by attaching at least some parts of peripheral portions of the second film to each other.

15. The flexible container according to claim 1, wherein an internal pressure of the gas enclosing portion in which the gas is enclosed is not less than 10 kPa and not more than 500 kPa.

16. The flexible container according to claim 1, wherein:

the second film is arranged so as to surround the accommodation region; and the gas enclosing portion is arranged on an outer side of the accommodation region and between the first film and the second film.

17. A flexible-container-packed product, comprising:

the flexible container according to claim 1; and the content to be accommodated that is accommodated in the accommodation region of the flexible container.

18. A flexible container, comprising:

a sheet that forms the flexible container, wherein:

the sheet includes:

a plurality of films layered in the sheet comprising:

a first film including a first base-material layer made of a single material having a heat-sealing property and a gas barrier property or made of materials having the heat-sealing property and the gas barrier property, all the materials having a common main chain and a common side chain, and a second film including a second base-material layer made of a single material that is the same single material as the first base-material layer or made of materials that are the same materials as the first base-material layer;

the first film and the second film are attached to each other by heat sealing;

a gas enclosing portion, which is partially non-attached and in which gas is able to be enclosed, is formed between the first film and the second film;

a function layer that protects the first base-material layer or the second base-material layer is formed on at least one of an outer surface of the first film and an outer surface of the second film;

the second film is arranged on an inner side of the first film;

an accommodation region that accommodates a content to be accommodated is included on an inner side of the second film; and gas is enclosed in the gas enclosing portion.

19. The sheet according to claim 18, wherein the function layer is a medium printing layer.

* * * * *